United States Patent Office 3,530,147
Patented Sept. 22, 1970

3,530,147
COMBINED INHIBITORS IN SULFOLANE PRODUCTION
Jan P. Campen and Willem Brackman, Amsterdam, Netherlands, assignors to Shell Oil Company, New York, N.Y., a corporation of Delaware
No Drawing. Filed May 17, 1968, Ser. No. 729,907
Claims priority, application Netherlands, Dec. 19, 1967, 6717353
Int. Cl. C07d 63/04
U.S. Cl. 260—332.1
4 Claims

ABSTRACT OF THE DISCLOSURE

The process of producing sulfolane compounds which comprises the reaction of a conjugated diene and sulfur dioxide to produce a sulfolene compound and the subsequent hydrogenation of the sulfolene compound to sulfolane compounds is improved by conducting the reaction of the conjugated diene and sulfur dioxide in the presence of an inhibitor mixture of a sterically hindered phenol and phenyl-β-naphthyl amine.

BACKGROUND OF THE INVENTION

It is known in the art that sulfolene compounds are prepared by the reaction of conjugated dienes and sulfur dioxide and that the sulfolene compounds are hydrogenated to sulfolane compounds as illustrated below for the simplest sulfolane compound, namely, sulfolane.

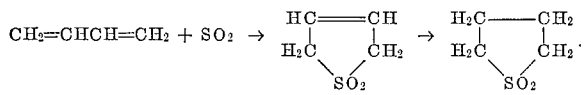

The reaction between the conjugated diene and sulfur dioxide is generally conducted in the presence of one or more inhibitors in order to retard side reactions such as polymerization of the conjugated diene and/or formation of polysulfones. Phenols with two or more hydroxyl groups are frequently employed as inhibitors, for example, catechol, hydroquinone, 2,5-di-tert-butylhydroquinone, pyrogallol or p-tert-butylcatechol.

After formation of the sulfolene compound from the conjugated diene and sulfur dioxide, the unconverted sulfur dioxide is removed and the resulting sulfolene product mixture is hydrogenated to the corresponding sulfolane compound in the present of metal catalysts such as a catalyst containing nickel and/or one or more of the metals of the platinum group. Although the removal of the sulfur dioxide from the sulfolene product mixture allows direct hydrogenation of the sulfolene compounds without extensive purification thereof, the activity of the hydrogenation catalyst generally decreases rapidly and must repeatedly be renewed or regenerated.

SUMMARY OF THE INVENTION

It has now been found that the activity of the hydrogenation catalyst employed for hydrogenating sulfolene compounds can be substantially prolonged by employing a combined inhibitor mixture of a sterically hindered phenol and phenyl-β-naphthyl amine in the reaction of the conjugated diene with sulfur dioxide to form the sulfolene compound. For example, the use of an inhibitor mixture of 2,6-di-tert-butyl-4-methylphenol and phenyl-β-naphthyl amine in the reaction of butadiene and sulfur dioxide, followed by removal of the unconverted sulfur dioxide, results in a sulfolene product mixture which is rapidly hydrogenated to the sulfolane product in the presence of a Raney nickel catalyst without undue poisoning of the catalyst.

DESCRIPTION OF THE PREFERRED EMBODIMENTS

Reactants

The sulfolene compounds which are hydrogenated to the sulfolane products are suitably prepared from any conjugated diene of up to 16 carbon atoms and represented by the Formula I

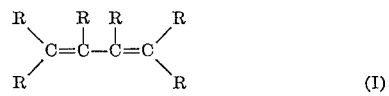
(I)

wherein R independently is hydrogen or lower alkyl of up to 4 carbon atoms. Exemplary conjugated dienes therefore include butadiene; monomethylbutadienes such as isoprene and piperylene, the dimethylbutadienes such as 4-methyl-1.3-pentadiene, 1,2-dimethylbutadiene; and 2,3-dimethylbutadiene; the monoethylbutadienes such as 1,3-hexadiene; 1,3-heptadiene; 2,4-octadiene; 1,3-decadiene; and 2,4-decadiene. Conjugated dienes wherein each R is hydrogen or methyl are preferred, especially butadiene.

Any commercially available grade of sulfur dioxide of reasonable purity is suitable for use in the process of the invention. Molar ratios of sulfur dioxide to conjugated diene of from about 1:1 to about 4:1 are generally employed, although molar ratios of from about 1:1:1 to about 2:1 are preferred.

Inhibitor combination

Essential to the improved process of the invention is the use of the combination of a sterically hindered phenol as an inhibitor and phenyl-β-naphthyl amine as a co-inhibitor, in the reaction of the sulfur dioxide and the conjugated diene. By the term "sterically hindered phenol" is meant a phenol compound in which both ortho positions with respect to each phenolic hydroxyl is substituted with alkyl groups having up to 8 carbons, with the proviso that at least one of the alkyl group has no hydrogen atoms on the carbon linked to the ortho position of the aromatic ring, i.e., one of the alkyl substituents is tertiary alkyl. The presence of inhibitors belonging to the class of phenols in which the phenolic hydroxyl group is not sterically hindered at both ortho positions with alkyl substituents has the effect of reducing the active life of the hydrogenation catalyst. Accordingly, it is generally desirable to conduct the reaction of the conjugated diene and sulfur dioxide in the substantial absence of such unhindered phenols; generally the presence of less than about 0.04 percent by weight of such unhindered phenols based of conjugated diene is satisfactory.

The amounts of the sterically hindered phenol and the phenyl-β-naphthyl amine can vary within wide limits. Generally, it is advisable to use either component in amounts of from about 0.01 percent by weight to about 1.0 percent by weight based on the weight of conjugated diene with amounts of each component of from about 0.05 percent by weight to 0.3 percent by weight on the same basis being preferred.

One class of suitable hindered phenols is the class of 2,6-dialkyl-20 phenols represented by the Formula II

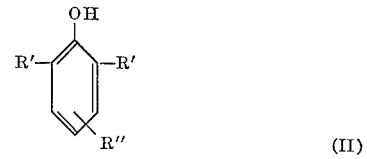
(II)

wherein each R′ is an alkyl group having up to 8 carbon atoms, with the proviso that at least one of the R′ group is tertiary alkyl, and R″ is selected from hydrogen and alkyl group of up to 8 carbon atoms. Exemplary hindered phenols of Formula II include 2,6-di-tert-butylphenol, 2,6- di-tert-butyl-4-methylphenol, 2,6-di-tert-butyl-4-isopropylphenol, 2,4,6-tri-tert-butylphenol, 2-tert-butyl-6-isopropylphenol, 2-tert-butyl-6-isopropyl-4-ethylphenol, 2,6-di-tert-amylphenol, 2,6-di-tert-octylphenol, and 2,6-di-tert-octyl-3-methylphenol. Preferred phenols of Formula II are those in which both alkyl substituent ortho to the hydroxy group are tertiary alkyl groups, especially 2,6-di-tert-butyl-4-methylphenol.

Another class of hindered phenols which is suitably employed in the process of the invention is the class of bisphenols represented by the Formula III

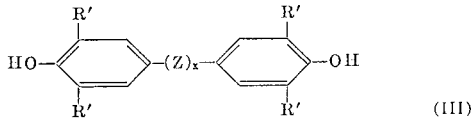

(III)

wherein each R' has the previously defined significance and at least one R' on each aromatic ring is tertiary alkyl, Z is an alkylene group of up to 8 carbon atoms, preferably one carbon, i.e., methylene, and X is a whole number of from 0 to 1. Exemplary bisphenols of Formula III include bis(3,5-di-tert-butyl-4-hydroxyphenyl)methane; bis(3-isopropyl-5-tert-butyl-4-hydroxylphenyl)-methane; 1,2-bis(3,5-di-tert-butyl-4-hydroxyphenyl)ethane; 1,3-bis(3-cyclohexyl-5-tert-amyl-4-hydroxyphenyl)propane; and 1,8 - bis(3 - isopropyl-5-tert-butyl-4-hydroxyphenyl)octane. When $x$ is 0, typical compounds are 4,4'-dihydroxy-3,5-diisopropyl-3',5'-di-tert-butylbiphenyl and 4,4'-dihydroxy-3,3',5,5'-tetra-tert-butylbiphenyl. Preferred bisphenols of Formula III are those wherein each R' is tertiary alkyl.

Still another class of suitable hindered phenols is the class of 3,5 - dialkylhydroxybenzyl - substituted benzenes represented by the Formula IV.

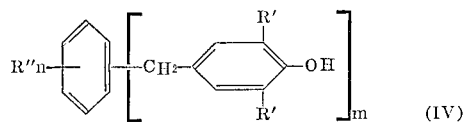

(IV)

wherein R' and R'' have the above-defined significance, at least one R' group on each aromatic ring is tertiary alkyl, $n$ is a whole number from 1 to 3 and $m$ is a whole number form 2 to 3. Exemplary compounds of Formula IV include 1,2-dimethyl - 4,5 - di(3,5 - di - tert-butyl-4-hydroxy)benzene; 1,2 - diisopropyl - 3,6-di(3-methyl-5-tert-butyl-4-hydroxybenzyl)benzene; 1,2,3 - trimethyl - 4,5,6-tri(3,5 - di - tert-butyl-4-hydroxybenzyl)benzene; and 1,4-dimethyl - 2,5 - di(3,5-di-tert-amyl-4-hydroxybenzyl)benzene. Preferred phenols of Formula IV are those wherein all R' groups are tertiary alkyl.

Formation of sulfolene compound

The reaction of the sulfur dioxide and conjugated diene is preferably carried out in the presence of a liquid diluent which is inert towards the reactants and products thereof. Suitable solvents are lower alkanols such as methanol, ethanol, isopropyl alcohol and lower dialkyl ketones such as methyl ethyl ketone and acetone. Molar ratios of inert diluents to conjugated diene of from about 1:1 to about 20:1 are generally satisfactory. The reaction of the sulfur dioxide and conjugated diene is also preferably effected in a substantially oxygen free atmosphere.

The contacting of the sulfur dioxide, conjugated diene, inhibitors and solvent is effected by a variety of procedures. In one modification, the entire amounts of reactants are contacted in an autoclave or similar reactor and maintained at reaction temperature and pressure until completion of the reaction. In another modification, the reaction is conducted in a continuous manner as by contacting the reactants during passage through a tubular reactor. As both sterically hindered phenols and phenyl-β-naphthyl amine are polymerization inhibitors for conjugated dienes, it is often advantageous to employ conjugated diene already containing either of said inhibitors to prevent polymerization of the conjugated diene during storage and transport. Consequently, in yet another modification, the conjugated diene containing one of said inhibitors, e.g., a sterically hindered phenol, is suitably contacted with the remaining reaction components, e.g., the phenyl-β-naphthyl amine, sulfur dioxide, and solvent, in either a batch or continuous process.

In order to obtain a sufficiently high reaction rate, the reaction between the conjugated diene and sulfur dioxide in the presence of a sterically hindered phenol and phenyl-β-naphthyl amine is best effected at a temperature of from about 50° C. to about 150° C., preferably from about 80° C. to about 120° C. It is usually advantageous to start the reaction between the conjugated diene and sulfur dioxide at a relatively high temperature and terminate the reaction at a relatively low temperature because in this way a high yield of sulfolene is obtained within a reasonable period of time. For example, the reaction of butadiene and sulfur dioxide is preferably conducted at an initial temperature of from 100 to 115° C. until about 20–60% of the conjugated diene has been reacted and at a final reaction temperature of from 80° C. to 90° C. until the completion of the reaction.

The pressure during the reaction between the conjugated diene and sulfur dioxide can be varied within wide limits, e.g., pressures of from 70 to 700 p.s.i.g. are satisfactory although pressures of from about 100 to about 425 p.s.i.g. are preferred.

On completion of the reaction between the conjugated diene and sulfur dioxide, the sulfolene product mixture is stripped of unconverted sulfur dioxide. Generally, the reduction of the amount of sulfur dioxide to less than 0.008 percent by weight based on the total product mixture is satisfactory. The removal of the sulfur dioxide as well as any volatile unreacted conjugated diene, e.g., butadiene, is readily accomplished by flushing the sulfolene product mixture with an inert gas such as nitrogen or by distilling off a portion of the solvent in which the reaction of sulfur dioxide and conjugated diene was conducted. In yet another procedure, the sulfur dioxide is suitably removed by treating the sulfolene product mixture with an alkaline solution which preferably contains a peroxide, e.g., hydrogen peroxide. In any sulfur dioxide removal procedure, it is preferred to maintain the temperature below about 70° C. in order to prevent decomposition of the sulfolene compound.

Hydrogenation of sulfolene compound

The hydrogenation of the sulfolene product mixture after removal of at least unconverted sulfur dioxide is generally carried out in the presence of the same inert diluents employed for the reaction of the sulfur dioxide and conjugated diene, e.g., lower alkanols and lower dialkyl ketones. It is suitable, however, to remove the diluents employed for the reaction of the sulfur dioxide and conjugated diene completely or partly before hydrogenation or to replace them by other diluents, e.g., sulfolenes or mixtures of sulfolenes and alcohols and/or esters.

The hydrogenation catalysts employed contain nickel and/or one or more of the metals of the platinum group, e.g., platinum, palladium, rhodium, iridium, osmium, and ruthenium. The catalysts suitably contain the metal in an active form, such as Raney nickel, or the metal is supported on a carrier such as charcoal or alumina- and silica-containing supports, e.g., alumina, silica, silica-alumina and silica-magnesia. It is also suitable to provide the metal catalyst employed in the hydrogenation in a colloidal form.

The hydrogenation of the sulfolene product mixture is effected in a batchwise, semi-continuous or continuous process. In any modification, the temperature range is from about 0° C. to about 50° C., preferably from about 18° C. to about 45° C. Suitable hydrogen partial pressures vary from about 70 to about 3000 p.s.i.g. although partial pressures varying from about 150 to about 1200 p.s.i.g. are preferred. The hydrogen is suitably provided as substantially pure hydrogen or as a hydrogen-containing gas mixture, such as platformer off gas, with at least a 40 percent by volume content of hydrogen. In order to preserve the catalyst life, it is desirable that the hydrogen source contain substantially no sulfur compounds.

In accordance with the nature of the conjugated diene reactant, the sulfolene and sulfolane compounds have up to 16 carbon atoms and are represented by the Formulas V and VI, respectively,

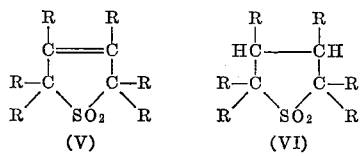

by weight. The sulfolene-containing product mixture thus obtained was hydrogenated in the presence of Raney nickel (0.3 percent by weight based on total mixture) with hydrogen at a pressure of 427 p.s.i.g. and at a temperature of 20° C. for 6 hours. The time for a 50% conversion of the sulfolene present in the starting material ($t_{50}$) and the percentage of sulfolene that had been converted at the end of each experiment were measured.

The results are given in Table I. Experiment I was carried out with phenyl-β-naphthyl amine and Ionol (2,6-di-tert-butyl-4-methylphenol, a representative sterically hindered phenol) as the inhibitor combination and, for comparison, experiments 2–3 were carried out with other aryl amine inhibitors in combination with Ionol, Experiment 4 was carried out with phenyl-β-naphthyl amine as the only inhibitor and Experiments 5–8 were carried out with only phenolic inhibitors.

TABLE I

| | Inhibitor A | | Inhibitor B | | | Percent sulfolene converted after 6 hours |
|---|---|---|---|---|---|---|
| Experiment: | Type | Percent by weight calcd. on butadiene | Type | Percent by weight calcd. on butadiene | $t_{50}$ | |
| 1 | Phenyl-β-naphthylamine | 0.1 | Ionol | 0.1 | 29 minutes | >99 |
| 2 | Phenyl-α-naphthylamine | 0.1 | ---do--- | 0.1 | >6 hours | 6 |
| 3 | N,N-bis-(di-2-butyl)-phenylenediamine | 0.1 | ---do--- | 0.1 | ---do--- | 21 |
| 4 | Phenyl-β-naphthylamine | 0.1 | None | | ---do--- | 22 |
| 5 | Ionol | 0.1 | Ionol | 0.1 | ---do--- | 23 |
| 6 | ---do--- | 0.1 | ---do--- | 1.0 | 3 hours | 75 |
| 7 | p-t-Butylcatechol | 0.1 | ---do--- | 1.0 | >6 hours | 23 |
| 8 | Hydroquinone | 0.1 | ---do--- | 0.1 | ---do--- | 9 | wherein R has the same significance previously defined for the diene reactant (Formula I). Examples of sulfolane compounds include sulfolane (wherein R=H), the monomethylsulfoanes, the monoethyl sulfolanes and the dimethylsulfolanes. The sulfolane compounds, of course, possess the same R substituents as the sulfolene compounds from which they are prepared.

Sulfolane compounds have utility for a variety of applications. For example, sulfolane is a chemical of commerce and is useful as a solvent for selective extraction of aromatic hydrocarbons as disclosed by U.S. 2,921,015 of Shiras, issued Jan. 12, 1960.

To further illustrate the process of the invention, the following example is provided. It should be understood that the details thereof are not to be regarded as limitations, as they may be varied as will be understood by one skilled in this art.

EXAMPLE

A series of experiments was carried out by the following procedure:

A 5-liter autoclave provided with a stirring device and previously flushed with nitrogen was charged with 2110 g. of acetone, 1080 g. of sulfur dioxide and the amount of inhibitor as indicated for each experiment under "Inhibitor A" in Table I. Subsequently the autoclave with contents was heated to 110° C., whereupon 650 g. of butadiene was added in which the amount of inhibitor as indicated for each experiment under "Inhibitor B" in Table I was present. The contents of the autoclave were stirred for 1½ hours at 110° C., 1½ hours at 100° C., 3 hours at 90° C. and then 1 hour at 85° C. The pressure amounted to 256 p.s.i.g. at the start of the reaction.

After cooling, the contents of the autoclave were stripped with acetone vapor at a temperature of 56° C. to 60° C. until the quantity of sulfur dioxide still present in the product mixture amounted to less than 0.004 percent

We claim as our invention:

1. In the process of producing sulfolane compounds which comprises the steps of (1) contacting a conjugated diene and sulfur dioxide in the presence of a sterically hindered phenol as inhibitor to produce a sulfolene compound-containing product mixture, wherein the said sterically hindered phenol is a phenol in which both ortho positions with respect to the phenolic hydroxyl are substituted with alkyl groups having up to 8 carbons, with the proviso that at least one of the alkyl groups is a tertiary alkyl, (2) removing the unconverted sulfur dioxide from said product mixture, and (3) hydrogenating the resulting substantially sulfur dioxide-free product mixture to produce the sulfolane compound in the presence of a nickel or a platinum metal catalyst, the improvement which comprises contacting the conjugated diene and sulfur dioxide in the additional presence of phenyl-β-naphthyl amine as co-inhibitor.

2. The process of claim 1 wherein the sterically hindered phenol and the phenyl-β-naphthyl amine are each present in from about 0.01 percent to about 1.0 percent by weight based on weight of conjugated diene.

3. The process of claim 2 wherein the sterically hindered phenol is a 2,6-di-tert-alkylphenol.

4. The process of claim 3 wherein the sterically hindered phenol is 2,6-di-tert-butyl-4-methylphenol.

References Cited

UNITED STATES PATENTS 2,430,395  11/1947  Frey _____ 260—681.5

HENRY R. JILES, Primary Examiner

C. M. SHURKO, Assistant Examiner

U.S. Cl. X.R.

260—666.5